United States Patent
Bhattathiri et al.

(10) Patent No.: US 11,757,937 B2
(45) Date of Patent: Sep. 12, 2023

(54) ENABLING WEBAPP SECURITY THROUGH CONTAINERIZATION

(71) Applicant: VMware, Inc., Palo Alto, CA (US)

(72) Inventors: Madhavan Bhattathiri, Bengaluru (IN); Mohammed Lazim, Bengaluru (IN); Ben Joseph, Bengaluru (IN); Gangadhar Nittala, Bengaluru (IN)

(73) Assignee: VMWARE, INC., Palo Alto, CA (US)

( * ) Notice: Subject to any disclaimer, the term of this patent is extended or adjusted under 35 U.S.C. 154(b) by 242 days.

(21) Appl. No.: 16/131,814

(22) Filed: Sep. 14, 2018

(65) Prior Publication Data

US 2020/0092332 A1 Mar. 19, 2020

(51) Int. Cl.
*G06F 21/53* (2013.01)
*H04L 9/40* (2022.01)

(52) U.S. Cl.
CPC .............. *H04L 63/20* (2013.01); *G06F 21/53* (2013.01); *G06F 2221/034* (2013.01)

(58) Field of Classification Search
CPC ..... H04L 63/20; G06F 21/53; G06F 2221/034
See application file for complete search history.

(56) References Cited

U.S. PATENT DOCUMENTS

| 11,089,064 B1* | 8/2021 | Sarukkai | H04L 63/205 |
| 2014/0006347 A1* | 1/2014 | Qureshi | H04W 12/06 |
| | | | 707/783 |
| 2017/0003938 A1* | 1/2017 | Gulkis | G06F 8/315 |
| 2017/0250853 A1* | 8/2017 | Evans | H04L 63/0281 |
| 2017/0339564 A1* | 11/2017 | Momchilov | H04W 4/50 |
| 2019/0036906 A1* | 1/2019 | Biyani | H04L 9/3297 |
| 2019/0230090 A1* | 7/2019 | Kathiara | H04L 9/3247 |
| 2019/0238467 A1* | 8/2019 | Guan | H04L 43/0882 |
| 2019/0246149 A1* | 8/2019 | Reza | H04N 21/2347 |
| 2019/0332787 A1* | 10/2019 | Graf | H04W 12/00503 |
| 2020/0084132 A1* | 3/2020 | Chauhan | H04L 67/42 |

\* cited by examiner

*Primary Examiner* — Lynn D Feild
*Assistant Examiner* — Vladimir I Gavrilenko
(74) *Attorney, Agent, or Firm* — Thomas Horstemeyer, LLP (57) ABSTRACT

Disclosed are various examples for web application security through containerization. In one example, a web application is executed within a container application. The container application includes a management software development kit (SDK). A security policy for the web application is retrieved from a management service. The security policy is applied to the web application using the management SDK of the container application.

20 Claims, 5 Drawing Sheets

ENABLING WEBAPP SECURITY THROUGH CONTAINERIZATION

BACKGROUND

While business applications suites can offer basic business functionality for organizations, it can be desirable to provide an increased level of custom functionality for enterprise employees and other users. Organizations develop enterprise applications, including workflow-specific mobile applications for sales, customer service, finance, marketing, research and development and other business processes. This way, these teams can work more efficiently, and the business can engage with customers, partners and internal teams on a deeper level. To further increase productivity, enterprises may desire to provide employees with access to their applications on many types of devices and from many locations.

Organizations and other enterprises may desire to secure enterprise emails, presentations, documents and other content to prevent theft, data loss and unauthorized access. A management service can provide protection for this content by securing the enterprise applications through which the content is accessed. One solution is to include protections to each application individually. However, this solution can be costly and inefficient. Modifying each application individually to include the ability to apply security protections can result in inefficient usage of time. In addition, where multiple applications are installed, the security protections can be provided by a common set of instructions or code in each of the applications. This redundant storage of similar instructions can use an inordinate amount of storage space.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to web application security using containerization. Organizations and other enterprises can secure emails, presentations, documents and other content to prevent theft, data loss and unauthorized access. A management service can provide protection for this content by securing the enterprise applications through which the content is accessed. Modifying each application individually to include security protections can result in inefficient usage of time and redundant storage of security instructions or code. The present disclosure describes more efficient application security mechanisms by enabling web application security using containerization.

According to some examples, a web application can be executed within a container application. The container application can be created using a software development kit (SDK) associated with a management service. The web application can be executed within a sandboxed environment within the container application. The container application can utilize a single copy of the management SDK for multiple web applications. The management SDK can include instructions and functions that are applied to web applications by the container application. A security policy for the web application can be retrieved from the management service. The security policy can be applied to the web application using a function defined by the management SDK of the container application.

User credentials can be obtained. The user credentials can be associated with a user account with the management service. The user credentials can be encrypted or stored in an encrypted data store of a client device by the container application or the management SDK. The user credentials can be utilized to provide persistent access to the web application. The user credentials can also be utilized for single sign-on to provide persistent access to multiple web applications that are executed within the container application.

The web application can be executed in response to a push notification. The push notification can identify the web application by including an identifier of the web application. Push notifications can be delivered to the web application through the underlying container application.

The security policy can include a data loss prevention setting that is applied to the web application. The data loss prevention setting can be applied using the function defined by the management SDK of the container application. The data loss prevention setting can include a copy and paste into setting, a copy and paste out setting, a printing setting, a camera setting, an email setting, a Bluetooth setting and a screenshot setting. These settings can enable or disable corresponding capabilities on the client device. The security policy can also include a geofencing setting that enables usage of the web application based on a location of the client device relative to a geographical area. For example, the policy can enable usage of the web application within a particular geographical location, perimeter or area and disable its usage outside of the area.

Figure 1:
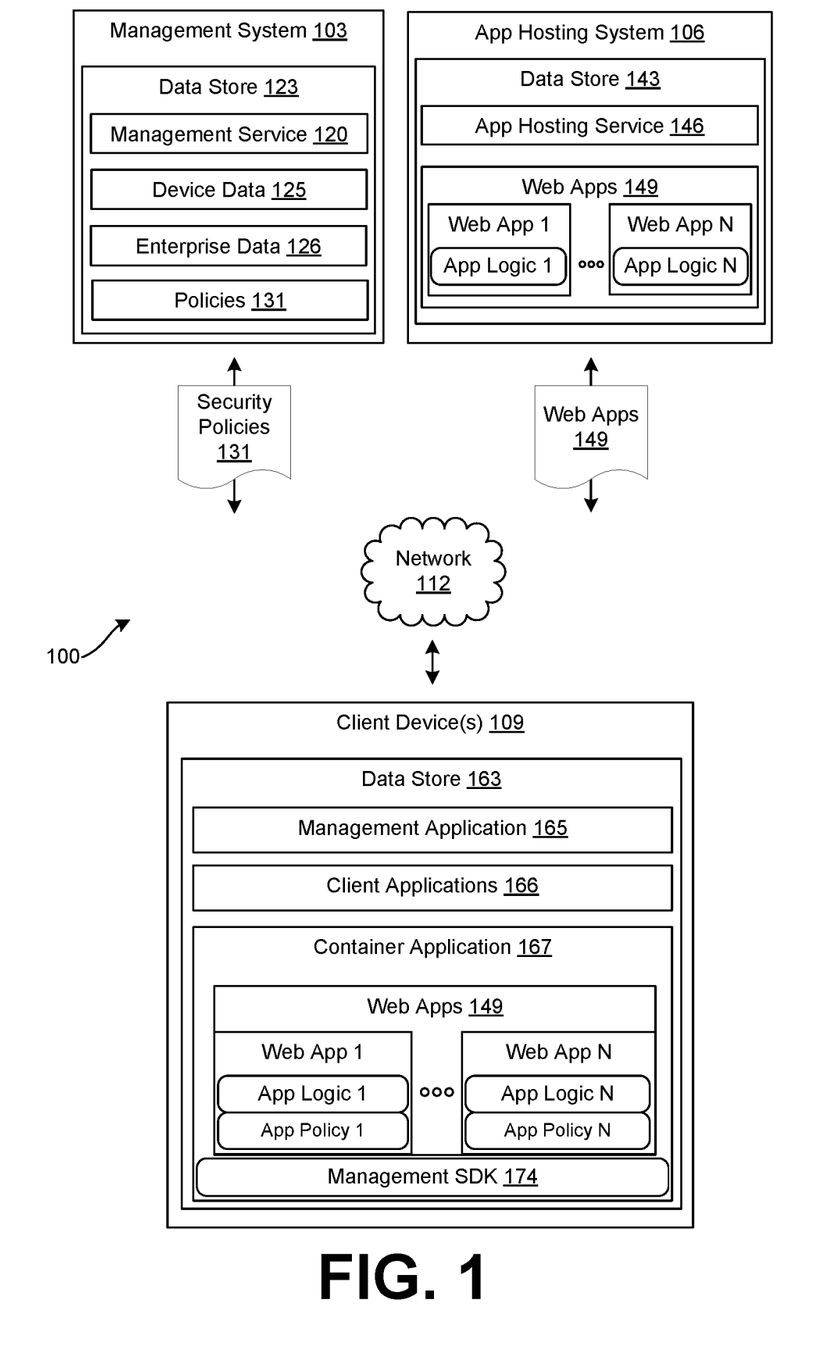
FIG. 1 is a drawing of an example of a networked environment, including a management system, a destination device and a client device.

With reference to FIG. 1, shown is an example of a networked environment 100. The networked environment 100 can include a management system 103, an application hosting system 106, and client device(s) 109 in communication with one another over a network 112. The management system 103 can provide an enterprise with access to email, corporate documents, social media and other enterprise content The network 112 can include, for example, the Internet, intranets, extranets, wide area networks (WANs), local area networks (LANs), wired networks, wireless networks, other suitable networks, or any combination of two or more such networks. The networks can include satellite networks, cable networks, Ethernet networks, cellular networks, telephony networks and other types of networks.

The management system 103 can include a server computer or any other system providing computing capability. Alternatively, the management system 103 can include a plurality of computing devices that are arranged in one or more server banks, computer banks, or other arrangements. The management system 103 can include a grid computing resource or any other distributed computing arrangement. The computing devices can be located in a single installation or can be distributed among many different geographical locations. The management system 103 can also include or be operated as one or more virtualized computer instances. For purposes of convenience, the management system 103 is referred to in the singular. Even though the management system 103 is referred to in the singular, it is understood that a plurality of management systems 103 can be employed in the various arrangements as described above. As the management system 103 communicates with the client device 109 remotely over the network 112, the management system 103 can be described as a remote management system 103 or a collection of one or more remote computing devices.

The management system 103 can execute a management service 120 to oversee management of the client devices 109. The components executed on the management system 103 can include the management service 120, as well as other applications, services, processes, systems, engines or functionality not discussed in detail. An enterprise, such as one or more companies or other organizations, can operate the management service 120 to oversee or manage the operation of the client devices 109 of its employees, contractors, customers, students or other users having user accounts with the enterprise. An enterprise can be any customer of the management service 120. An enterprise can also be referred to as an organization.

The management service 120 can have a command queue storing an action to perform on a particular client device 109 upon check-in of the client device 109. For instance, the management application 165 can cause the client device 109 to check-in with the management service 120, identify an action in the command queue and perform the action. An action in the command queue can direct the installation of a profile or the execution of a command or other actions to install software components or implement policies.

In addition, the management service 120 can request that the client device 109 check in using a notification service like APPLE® Push Notification Service (APNS), GOOGLE® Cloud Messaging (GCM), or WINDOWS® Push Notification Services (WNS). The management service 120 can transmit a request to the notification service requesting that the client device 109 check-in or requesting that an application or web app check-in. The notification service can push or otherwise route a notification to the client device 109. Once the notification is received, the management application 165 or container application 167 can cause the client device 109 to check-in with the management service 120. As described above, the management application 165 can determine whether a command queue provided by the management service 120 for the respective client device 109 contains any commands or resources for the client device 109, and, if so, can cause the commands or resources to be downloaded or implemented on the client device 109. Other types of push notifications can also be transmitted through the push notification service.

The management service 120 can provide functionality using application program interfaces (APIs). The management service 120 can oversee the operation of client devices 109 enrolled with the management service 120 as well as manage enrollment and un-enrollment operations of the client devices 109. APIs or API calls can be provided for other functionalities of the management service 120 as discussed. For instance, APIs provided can include Representational State Transfer (REST) APIs, Identity Services Engine (ISE) APIs and other APIs.

The data store 123 can include memory of the management system 103, mass storage resources of the management system 103, or any other storage resources on which data can be stored and accessed by the management system 103. The data stored in the data store 123 can include management data including device data 125, enterprise data 126 and policies 131, as well as other data.

Generally, device data 125 can include data associated with a configuration of a client device 109 enrolled or managed by the management service 120 as well as an identifier of the client device 109. The identifier can be a serial number, media access control (MAC) address, other network address or other device identifier. In addition, the device data 125 can include an enrollment status indicating whether a client device 109 has been enrolled with the management service 120. In one example, a client device 109 designated as "enrolled" can be permitted to access the enterprise data 126 while a client device 109 designated as "not enrolled," or having no designation, can be denied access to the enterprise data 126.

Additionally, device data 125 can include indications of the state of the client device 109. In one example, these indications can specify applications that are installed on the client device 109, configurations or settings that are applied to the client device 109, user accounts associated with the client device 109, the physical location of the client device 109, the network to which the client device 109 is connected, and other information describing the current state of the client device 109.

Policies 131 can include application-specific policies for the web applications 149 and client applications 166 that are loaded or installed within the container application 167. While the client applications 166 are shown outside of the container application 167, the client applications 166 can also be installed within the container application 167 or launched by the container application 167. The application policies 131 can define the policies 131 and additional requirements applicable to individual web applications 149. An application security policy 131 can also define the policies 131 and additional requirements applicable to a group of web applications 149. The policies 131 can be both application-specific as well as specific to particular users or user accounts with the management service 120. The policies 131 can also include whitelisted and blacklisted applications and web applications 149 for the client device 109. Application whitelisting for the client device 109 permits applications and web applications 149 in a list to be executed on the client device 109, while applications and web applications 149 that are excluded from the list cannot be executed on the client device 109. Application blacklisting for the client device 109 prevents applications and web applications 149 in a list from being executed on the client device 109, while applications that are excluded from the list can be executed on the client device 109.

The policies 131 can be based on a number of factors, including geographical location of the client device 109, activation status, enrollment status and authentication data, including authentication data obtained by a device registration system, time, date and network properties, among other factors. The management service 120 can communicate with a management application or another client application 166 executable on the client device 109 to determine whether states exist on the client device 109 that do not satisfy one or more policies 131. Some of these states can include a virus or malware being detected on the client device 109, installation or execution of a blacklisted client application 166 or a client device 109 being "rooted" or "jailbroken,"

where root access is provided to a user of the client device 109. Additional states can include the presence of particular files, questionable device configurations, vulnerable versions of client applications 166, or other vulnerability, as can be appreciated.

The management service 120 can communicate with the management application 165 or the container application 167 to determine which states exist on the client device 109. The states can include a list of client applications 166 that are installed, running or displayed on the client device 109. Additional states can include a list of hardware settings of the client device 109. The list of hardware settings can identify whether a hardware device of the client device 109 is enabled or disabled. For instance, a particular web application 149 can be associated with a security policy 131 that requires a particular hardware setting for a Bluetooth device, a WiFi device, an infrared device, a camera device, an audio recording device, a speaker device, a near-field communication (NFC) device, a radio-frequency identification (RFID) device or another hardware device. The security policy or policies 131 for the particular web application 149 can require that one or a group of the hardware devices are enabled or disabled. The container application 167 can utilize functions defined within the management SDK 174 to apply the hardware settings to the particular web application 149. For example, the management SDK 174 can include functions that can be used to apply the hardware setting or settings upon execution of the particular web application 149, loading of the particular web application 149 or when the particular web application 149 is displayed on the client device 109.

The states can also include software settings of the client device 109. A list of software settings can identify whether a software functionality of the client device 109 is enabled or disabled. The software functionality can be provided by an operating system of the client device 109 or other instructions executed on the client device 109. A particular web application 149 can be associated with a security policy 131 that requires a particular software setting regarding software features including a copy and paste into setting, a copy and paste out setting, a printing setting, an email setting, a data backup setting, a location services setting and a screenshot setting. The settings can generally allow a particular web application 149 to access the respective software features.

Software features can also include a document setting that limits access to documents and enterprise data by whitelisting or blacklisting applications using functions of the management SDK 174. The access whitelist or blacklist can identify web applications 149, client applications 166, management application 165, and other applications on the client device 109. Access whitelisting can enable access by the applications in the list and disable access by applications that are excluded from the list. Access blacklisting can disable access by the applications in the list and enable access by applications that are excluded from the list. Network addresses such as Uniform Resource Locators (URLs), Uniform Resource Identifiers (URIs) and Internet Protocol (IP) addresses can also be whitelisted and blacklisted using functions of the management SDK 174. Address whitelisting can enable network addresses on the list to be accessible by the client device 109 or the web application 149. Address blacklisting can disable network addresses on the list from being accessed by the client device 109 or the web application 149.

The copy and paste into setting can enable or disable copy and pasting of content from external destinations into the web application 149. External destinations can be defined as external to the particular web application 149 or external to applications that use the management SDK 174. Applications that use the management SDK 174 can include the web application 149 and the client applications 166. Applications that use the management SDK 174 can include the web application 149 and the client applications 166. The copy and paste out setting can enable or disable copy and pasting of content to external destinations. The data backup setting can enable or disable data syncing with a storage service. The email setting can enable or disable the application to use a native email program to compose and send emails.

The security policy or policies 131 for the particular web application 149 can require that one or a group of the software features are enabled or disabled. The container application 167 can utilize functions defined within the management SDK 174 to apply the software settings to the particular web application 149. For instance, the management SDK 174 can include functions that can be used to apply the software settings upon execution of the particular web application 149, loading of the particular web application 149 or when the particular web application 149 is displayed on the client device 109.

Some of the hardware and software settings can be referred to as data loss prevention settings and can be utilized to prevent undesired sharing or use of enterprise data 126. Data loss prevention settings can include a setting, which can be a copy and paste into setting, a copy and paste out setting, a printing setting, a camera setting, an email setting, a Bluetooth setting and a screenshot setting. The particular web application 149 can also be geofenced so that usage of the particular web application 149 is enabled within a particular geographical location, perimeter or area and disabled or restricted outside of the area. In addition, each of the hardware or software restrictions can be enabled or disabled for the particular web application 149 as defined by a particular geographical location, perimeter, or area.

An enterprise can operate the management service 120 to oversee or manage the operation of the client devices 109 of its employees, contractors, customers, students, or other users having user accounts with the enterprise. The management service 120 can remotely configure the client device 109 by interacting with a management application 165 or another client application 166 executed on the client device 109. The management service 120 can transmit various software components to the client device 109, which can then be installed or configured by the management application 165. Such software components can include, for example, additional client applications 166, resources, libraries, drivers, device configurations, or other similar components that require installation on the client device 109 as specified by an administrator of the management service 120. The management service 120 can further cause policies 131 to be enforced on a client device 109. Policies 131 can include device-specific or user-specific settings, for example, restrictions or permissions pertaining to capabilities of a client device 109. For instance, policies 131 can require certain hardware or software functions of the client device 109 to be enabled or disabled during a certain time period or when the client device 109 is physically located at a particular location. Such policies can be implemented by the management application 165. The policies 131 can also be applied to the web applications 149 using the management SDK 174.

The application hosting system 106 can include a server computer or any other system providing computing capability. Alternatively, the application hosting system 106 can include a plurality of computing devices that are arranged in one or more server banks, computer banks, or other arrangements. The application hosting system 106 can include a grid computing resource or any other distributed computing arrangement. The computing devices can be located in a single installation or can be distributed among many different geographical locations. The application hosting system 106 can also include or be operated as one or more virtualized computer instances. For purposes of convenience, the application hosting system 106 is referred to in the singular. Even though the application hosting system 106 is referred to in the singular, it is understood that a plurality of application hosting systems 106 can be employed in the various arrangements as described above. While the application hosting system can be external to the management system 103, in other cases, the application hosting system 106 can be part of the management system 103.

The application hosting system 106 can include a data store 143. The data store 143 can store applications and services, including the application hosting service 146 and web applications 149. The web applications 149 can refer to a number of web applications including web application 1 through web application N. Each of the web applications 1 through N can include corresponding application logic 1 through N. The management service 120 can include a corresponding application policy for each of the web applications 149. In one example, each web application can execute according to its own application policy and restrictions. For example, an administrator could configure one web application to have a policy that restricts access to copy and paste functionality if the application accesses sensitive corporate resources, whereas another application can use copy and paste functionality for accessing less sensitive resources. In addition, the same web application can have different policies for different users. Continuing the example above, certain employees may be able to use copy and paste functionality for a particular web application whereas other employees cannot. These policies can be enforced using a sandboxed container to execute the application, as described below.

These corresponding application policies can be included in the policies 131. The application hosting service 146 can provide access to the web applications 149. The web applications 149 can be provided based on user credentials associated with an account with the management service 120.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch or any other device with like capability. The client device 109 can have a data store 163 that includes management application 165, container application 167, client applications 166, web applications 149, other applications, and other data. The client device 109 can also be equipped with networking capability or networking interfaces, including a localized networking or communication capability, such as a near-field communication (NFC) capability, radio-frequency identification (RFID) read or write capability or other localized communication capability. The client device 109 can be mobile and easily portable from one location to another.

The management application 165 can perform actions on the client device 109. For instance, the management application 165 can cause the client device 109 to check-in with the management service 120, identify an action in the command queue and perform the action. An action can include the installation of a profile, or the execution of a command or other actions to install software components or implement policies. The management application 165 can cause a check-in of the client device 109 periodically, on a schedule or upon an event, such as entering a physical location, changing a state of the client device 109, installing an application or receiving a notification on the client device 109. In one example, the contents of the command queue can include a command that the management application 165 executes on the client device 109. In another example, the contents of the command queue can include a resource or a web application 149 that the management application 165 installs on the client device 109. A command to install a web application 149 can include a URL, URI, IP address or other network address associated with the application hosting service 146 where the web application 149 can be accessed. Functions described for the management application 165 can alternatively be performed by the container application 167.

The container application 167 can include web applications 149 accessed from the application hosting service 146. The web applications 149 can be loaded and executed within the container application 167. The container application 167 can include runtime components needed in order execute the web applications 149. The container application 167 can also include a management software development kit (SDK) 174 associated with the management service 120. The management SDK 174 can include libraries, variables, files and code components that are utilized to perform functions based on the policies 131 of the management service 120. A developer does not need to add specific code to the web application 149 for the policies 131 to be applied to the web application 149. This is because the functions that enforce or apply the policies 131 are based on the management SDK 174, rather than the application logic for the web application 149. The container application 167 can utilize a single copy or instance of the management SDK 174 on the client device 109 for all of the web applications 149. This can result in memory efficiency through reduced storage redundancy.

While the container application 167 is referred to in the singular, multiple container applications 167 can be developed corresponding to different operating systems or platforms or for different types of client devices 109. While the container application 167 can be different in each case, the same set of web applications 149 can be utilized. The respective container applications 167 can be designed to access and load the same web applications 149 for use in their respective operating systems, platforms, environments, or devices. This improves efficiency for developers, as a single version of the web application 149 can be used for multiple different devices, operating systems, environments and platforms based on the respective container application 167.

The management SDK 174 can allow web applications 149 to connect to the management service 120 and fetch the security policies 131 assigned to the app to enable security and accessibility to internal resources. For example, at load time, the policies 131 for the web application 149 can be fetched and applied to an environment of the web application 149 within the container application 167. The management SDK 174 can also provide features and apply policies 131 to the web application 149 after load time. For example, the web application 149 can fetch internal resources such as the enterprise data 126, and the management SDK 174 can ensure that the communications are proxied through a particular proxy server or endpoint according to a policy 131.

Accordingly, the management SDK 174 can route certain communications, such as requests for enterprise data 126, through a proxy server address or another network address. The policies 131 can include the proxy server address or network address for the type of communication or request, and the management SDK 174 can include a function or instructions to utilize a proxy server address or network address that is specified.

The container application 167 can access the web application 149 from the application hosting service 146, load it into a sandboxed container of the container application 167, and execute it within the container. A portion of the web application 149 can be temporarily loaded into a container while another portion is more durably installed. For example, an application icon and network address can be permanently loaded or installed so that the web application 149 can be quickly accessed from a user interface of the container application 167, while executable code of the web application 149 is accessed and loaded in response to a selection of the application icon.

The container for the respective web application 149 can specify memory areas or addresses that are accessible by the web application 149. Memory addresses can be used to apply application whitelists and blacklists. Accordingly, memory addresses that are accessible or restricted can be specified for the container of a web application 149 so that data associated with applications, including other web applications 149 or client applications 166, can be accessible or restricted. Other memory addresses, such as system memory addresses, can also be specified as accessible or restricted for the web application 149 by its container.

The container application 167 or the web application 149 can use the management SDK 174 to retrieve a particular policy 131 for a particular web application 149. The policy 131 can be retrieved from the management service 120. The management SDK 174 can be used to retrieve an application-specific policy 131 at load time. Accordingly, the web applications 149 can be loaded in a sandboxed container that is defined by the policy 131. Policies 131 can be retrieved and applied to the web applications 149 at load time or thereafter. Policies 131 can also indicate whether the web application 149 is accessible offline. The container application 167 can provide offline access to the web applications 149 based on the policies 131.

In some examples, the container application 167 can be a browser application. The browser application can render a user interface for a network page, an application screen, or other interface. The client device 109 can also access web applications 149 through the network 112 using the browser application, which can render a user interface associated with a web application 149 or a network site on the client device 109.

Figure 2:
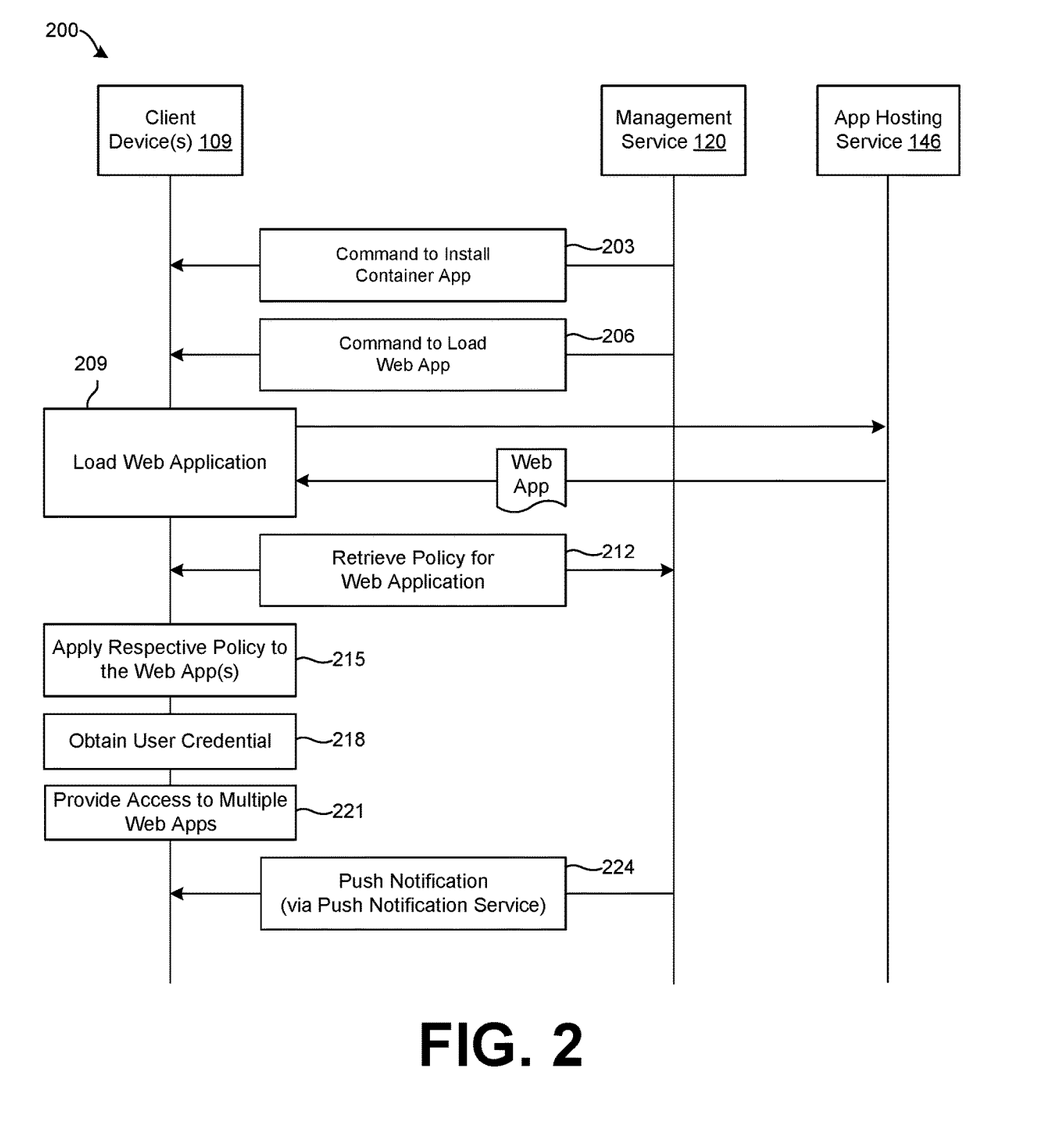
FIG. 2 is an example sequence diagram illustrating functionality implemented by components of the networked environment.

In FIG. 2, shown is an example sequence diagram 200 describing steps that can be performed by the components of the networked environment 100. Generally, the sequence diagram 200 describes how web applications 149 are executed within a container application 167 and how policies 131 are applied using the management SDK 174.

In step 203, the client device can receive a command to install a container application 167. A management application 165 can receive a command to install the container application 167. The command to install the container application 167 can include a network address to download the container application 167. The network address can identify a network endpoint of the management system 103, the application hosting system 106, or another network endpoint to download the container application 167. The management service 120 can place the command to install the container application 167 in a command queue for the client device 109. The client device 109 can check in with the management service 120 and retrieve the command from the command queue.

The management service 120 can also utilize a push notification service to push a command for the client device 109 to check in with the management service 120. The management service 120 can also cause the push notification service to push the command to install the container application 167 to the client device 109 or the management application 165. The management application 165 can implement the command by downloading the container application 167 from the indicated address and installing the container application 167 on the client device 109. Alternatively, a user can select, download, and install the container application 167 from an application store or a network site.

In step 206, a management application 165 or the container application 167 can receive a command to load the web application 149. The command to load the web application 149 can include a network address to access the web application 149. The network address can identify a network endpoint of the management system 103, the application hosting system 106, or another network endpoint to access the web application 149. The management service 120 can place the command to load the web application 149 in a command queue for the client device 109. The client device 109 can check in with the management service 120 and retrieve the command from the command queue. Alternatively, the command can be a command to launch or execute the web application 149 by accessing the web application 149, loading it into a container, and executing it.

The management service 120 can utilize a push notification service to push a command for the client device 109 to check in with the management service 120. The management service 120 can cause the push notification service to push the command to load the web application 149 to the client device 109, the management application 165, or the container application 167. The push notification can include an identifier of the web application 149 or otherwise identify the web application 149. Alternatively, a user can command the web application 149 to be loaded by selecting the web application 149 through an application store, or a network site of the application hosting service 146.

In step 209, the client device 109 can load the web application 149. Container application 167 can implement the command to load the web application 149. The container application 167 can launch the web application 149 by accessing it from the application hosting service 146, loading it into a container of the container application 167, and executing it in the container. A portion of the web application 149 can be temporarily loaded into a container while another portion is more durably installed. For example, a network address and an icon of the web application 149 can be installed. The container application 167 can generate a user interface that includes the icon so that a user can access the web application 149 by selecting the icon. When the icon is selected, the container application 167 can access the web application 149 from its network address and load the web application 149 into a container.

The web application 149 is referred to as being loaded into the container. However, the web application 149 can include client components and a server components. The client components of the web application 149 can be loaded and executed within the container application 167 of the client device 109. The server components of the web application 149 can be executed by application hosting service 146. The container application 167 can generate a user interface of the web application 149 for display on the client device 109. The user interface of the web application 149 can be based on HTML, JavaScript, or another format. Client components can be downloaded or updated on the client device 109 each time the network location of the web application 149 is accessed.

The container application 167 can include a management SDK 174. The container application 167 can load the web application 149 so that it can utilize the management SDK 174. Multiple web applications 149 can be loaded into respective sandboxed containers of the container application 167. Each of the web applications 149 can utilize the same copy of the management SDK 174. For example, each of the sandboxed containers specify that a memory area set of memory addresses for the management SDK is accessible by each of the web applications 149. A policy 131 can be applied to the web application 149 by applying the policy 131 to its sandboxed container.

In step 212, the client device 109 can retrieve a policy 131 for the web application 149. The container application 167 or the management SDK 174 can retrieve the policy 131 for the web application 149. The management SDK or container application 167 can retrieve the policy 131 at load time. While the policy 131 is referred to in the singular, it can include multiple settings or policies. While a policy 131 can be retrieved at load time, a policy 131 can also be obtained or updated at any time, including load time, run time, or when the web application 149 is not being accessed or executed.

In step 215, the client device 109 can apply the respective policy 131 to the web application 149 by creating a containerized sandbox that uses the restrictions established by the policy 131. In one example, this allows an application to be developed without regard a set of particular security policies that may be used, because the security policies can instead be applied to a container the application executes in, effectively applying the security policy to the application itself. For example, an application can be developed with copy and paste functionality. However, if a security policy for a particular user or device posture indicates copy and paste should be disabled or restricted to use only among certain applications, that policy can be enforced by the container executing the application rather than the application itself The container application 167 can retrieve the policy 131 and apply the policy 131 to the web application 149 at load time. Settings or requirements of the policy 131 can be applied at load time, including a sandboxed environment for the container of the web application 149. While policies 131 can be applied to the web application 149 at load time, some policies 131 can be implemented and updated at run time. For example, if the web application 149 fetches internal resources such as the enterprise data 126, the management SDK 174 can ensure that the communications are proxied through a particular proxy server or endpoint according to a policy 131. Accordingly, the management SDK 174 can route requests for enterprise data 126 through a proxy server address according to a policy 131. Hardware or software settings can also be updated and applied at run time.

In step 218, the client device 109 can obtain user credentials. For example, the container application 167 or a web application 149 can generate a user interface element through
which user credentials can be entered. The user credentials can include one or more of a username, a password, a PIN, or other credentials. The management SDK 174 can securely store the user credentials. For example, the management SDK 174 can encrypt the user credentials or store the user credentials in a secure data store of the client device 109. The secure data store can be secured based on a certificate or key.

In step 221, the client device 109 can provide access to multiple web applications 149 based on the user credentials. For example, the container application 167 can utilize a function of the management SDK 174 to provide a user with convenient access to the web application 149 without logging in or re-entering the user credentials. The container application 167 can provide persistent access to the web application 149. The container application 167 can also utilize the credentials for single sign-on to provide persistent access to multiple web applications 149 that are loaded within the container application 167. Once entered, the user credentials can remain valid for a specified threshold period of time. The container application 167 can delete the user credentials upon the occurrence of certain events. For example, after the threshold period of time, once the client device 109 is powered off, or other events.

In step 224, the client device 109 can receive a push notification for the web application 149. This feature can allow a user to interact with the web application 149 directly from the notification. Push notifications can be delivered to the web application 149 through the underlying container application 167. For example, the management service 120 or the application hosting service 146 can cause a push notification to be sent to the container application 167. The push notification can also identify the web application 149. The container application 167 can cause the notification to be displayed, for example, by a pop-up notification or from a notification bar in a notification bar. When the notification is selected, the web application 149 can be launched and provide a functionality indicated in the push notification.

Figure 3:
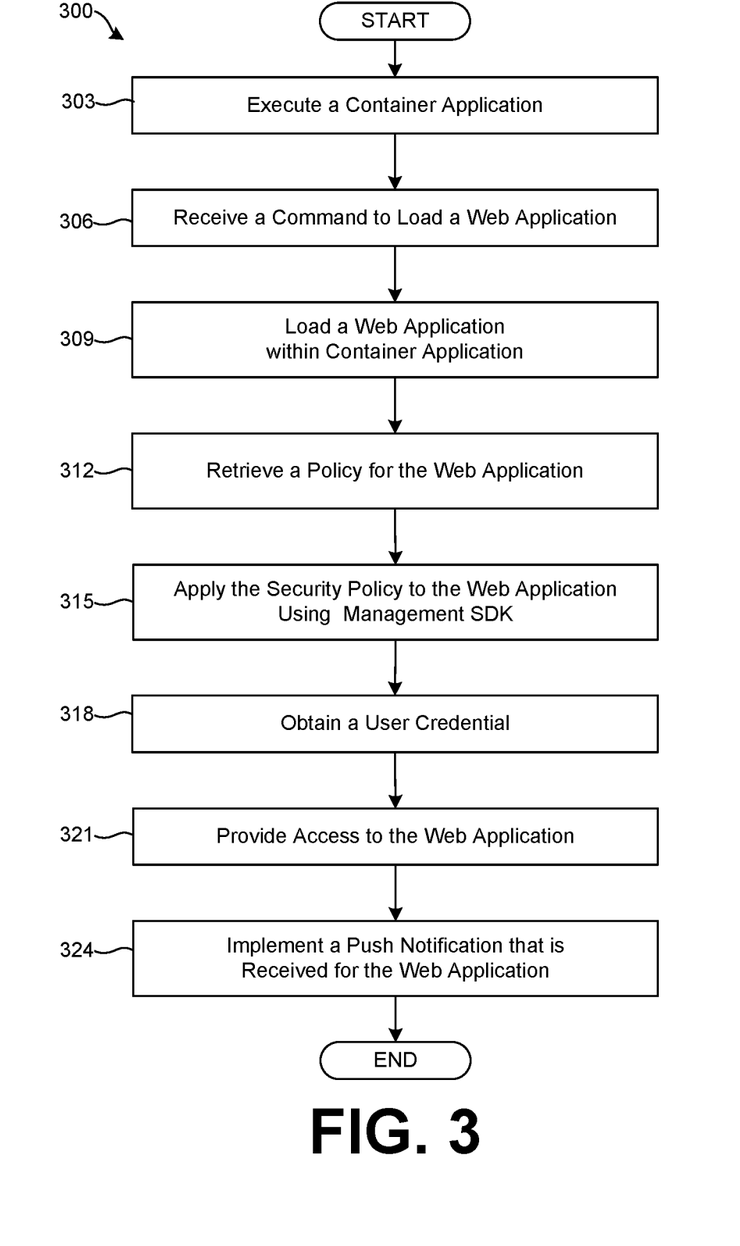
FIGS. 3 and 4 are example flowcharts illustrating functionality implemented by components of the networked environment.

With reference to FIG. 3, shown is an example flowchart 300 describing steps that can be performed by instructions executed by the client device 109. Generally, the flowchart 300 describes how the client device 109 executes web applications 149 within a container application 167, and applies policies 131 using the management SDK 174.

In step 303, the client device 109 can execute a container application 167. A user can select, download, and install the container application 167 from an application store, a network site, or another source. A management application 165 can already be running or executed on the client device 109. The management application 165 can receive a command to install the container application 167. The command to install the container application 167 can include a network address to download the container application 167. The network address can identify a network endpoint of the management system 103, the application hosting system 106, or another network endpoint to download the container application 167. A management service 120 can transmit the command to the management application165, or place the command to install the container application 167 in a command queue for the client device 109.

The client device 109 can check in with the management service 120 and retrieve the command from the command queue. The management service 120 can also utilize a push notification service to push a command for the client device 109 to check in with the management service 120. The management service 120 can cause the push notification service to push the command to install the container application 167 to the client device 109 or the management application 165. The management application 165 can implement the command by downloading the container application 167 from the indicated address and installing the container application 167 on the client device 109. Once the container application 167 is installed, it can be executed on the client device 109. The container application 167 can include a management SDK 174. The management SDK 174 can be stored in a single location or area of the data store 163. The container application 167 can make the management SDK 174 available to multiple web applications 149 that are accessed and loaded within the container application 167. The container application 167 can load each web application 149 into a respective sandboxed container of the container application 167 and can provide each sandboxed container with access to the management SDK 174. Accordingly, a single copy of the management SDK 174 can be utilized for multiple web applications 149. For instance, the container application 167 can provide the sandboxed container with access to a set of memory addresses of the management SDK 174.

In step 306, the container application 167 or the management application 165 can receive a command to load a web application 149. The command to load the web application 149 can include a network address to access the web application 149. The network address can identify a network endpoint of the management system 103, the application hosting system 106, or another network endpoint to access the web application 149. The management service 120 can place the command to load the web application 149 in a command queue for the client device 109. The client device 109 can check in with the management service 120 and retrieve the command from the command queue. Alternatively, the command can be a command to launch or execute the web application 149 by accessing the web application 149, loading it into a container, and executing it.

The client device 109 can load the web application 149 based on a push notification. The management service 120 can utilize a push notification service to push a command for the client device 109 to check in with the management service 120. The container application 167 can retrieve the command to load the web application 149. Alternatively, the management service 120 can cause the push notification service to push the command to load the web application 149. The push notification can include an identifier of the web application 149 or otherwise identify the web application 149.

In step 309, the client device 109 can load the web application 149. Container application 167 can access the web application 149 from the address indicated in the command to load the web application 149. The container application 167 can load and execute the web application 149 in a sandboxed environment or a container of the container application 167. The web application 149 can utilize the management SDK 174. For example, the container of the web application 149 can specify that a memory area set of memory addresses for the management SDK 174 is accessible by the web application 149. A policy 131 can be applied to the web application 149 by applying the policy 131 to its container.

In step 312, the client device 109 can retrieve a policy 131 for the web application 149. The container application 167 can transmit, to a management service 120, a request for policies 131 that are associated with the web application 149. The request can include an identifier of the web application 149. The request can also include user credentials or otherwise identify a user account. In response to the request, the management service 120 can provide a policy or policies 131. The policy 131 can be application-specific based on the web application 149. The policy can also be user-specific based on the user credentials or user account with the management service 120. The management SDK 174 can cause the web application 149 to transmit the request for policies 131.

In step 315, the container application 167, or the web application 149, can apply the policy 131 to the web application 149. The container application 167 or web application 149 can use at least one function defined in the management SDK 174 to apply the policy 131 to a container for the web application 149. The policy 131 can also include a set of whitelisted and or blacklisted applications, network addresses or memory addresses. The management SDK 174 can apply these settings to the container for the web application 149. The policy 131 can specify a particular set of hardware and software settings in order to use the web application 149. For example, if the web application 149 fetches internal resources such as the enterprise data 126, the management SDK 174 can ensure that the communications are proxied through a particular proxy server or endpoint according to a policy 131. Accordingly, the management SDK 174 can route requests for enterprise data 126 through a proxy server address according to a policy 131. The management SDK 174 or other aspects of the container application 167 can transmit a request for an updated policy 131, for example, periodically based on a particular period of time or on a schedule.

In step 318, the client device 109 can obtain user credentials. For example, the container application 167 or a web application 149 can generate a user interface element through which user credentials can be entered. The user credentials can include one or more of a username, a password, a PIN, or other credentials. The management SDK 174 can include a function that securely stores the user credentials. For example, the container application 167 or a web application 149 can use the function defined in the management SDK 174 to encrypt the user credentials or store the user credentials in a secure data store of the client device 109. The secure data store can be secured based on a certificate or key.

In step 321, the client device 109 can provide access to multiple web applications 149 based on the user credentials. The user credentials can be utilized to provide persistent access to the web application 149. The container application 167 can utilize a function of the management SDK 174 to provide a user with access to the web application 149 without logging in or re-entering the user credentials. The container application 167 can utilize the user credentials for single sign-on to provide persistent access to multiple web applications 149 that are loaded and executed within the container application 167. Once entered, the user credentials can be valid for a specified threshold period of time. The container application 167 can delete the user credentials upon the occurrence of certain events. The container application can remove the user credentials after the threshold period of time, once the client device 109 is powered off, or in response to other events.

In step 324, the client device 109 can implement a push notification for the web application 149. The management service 120 or the application hosting service 146 can cause a push notification to be sent to the container application 167. The client device 109 can receive the push notification. The container application 167 can deliver the push notification to the web application 149. The container application 167 can cause the notification to be shown on the client device 109, for example, in a notification bar or anywhere on a display of the client device 109. The container application 167 can load the web application in response to a user selection of the push notification, and the web application 149 can implement a functionality indicated in the push notification.

Figure 4:
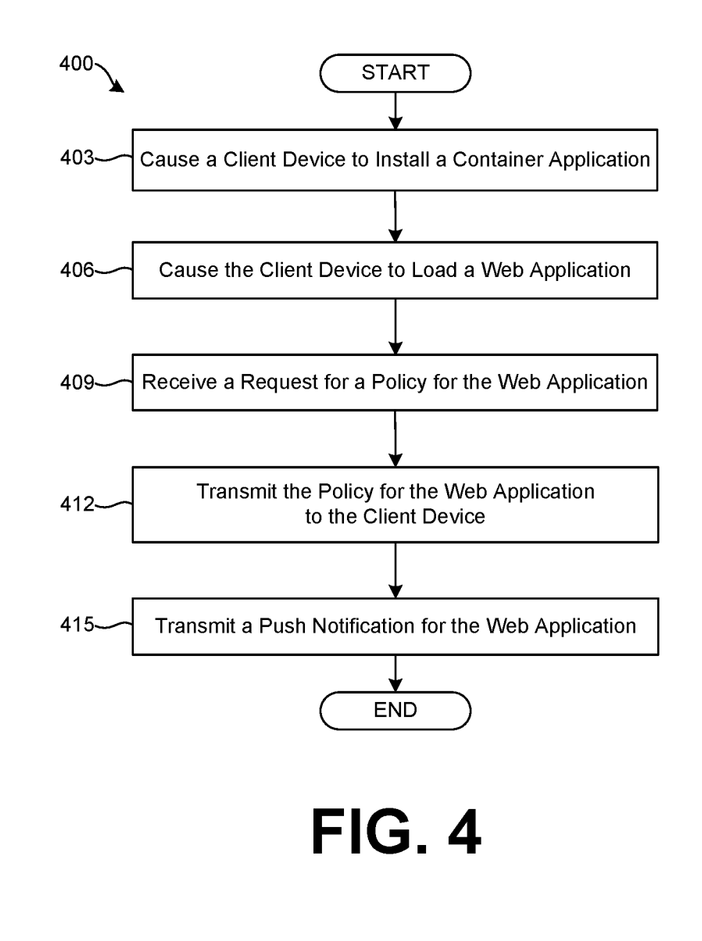

With reference to FIG. 4, shown is an example flowchart 400 describing steps that can be performed by instructions executed by the management service 120. Generally, the flowchart 400 describes how the management service 120 installs the container application 167. The management service 120 also launches web applications 149 within a container application 167, and policies 131 to be applied using the management SDK 174.

In step 403, the management service 120 can cause the client device 109 to install a container application 167. The management service 120 can generate a command to install a container application 167. The management service 120 can transmit the command to the client device 109. A management application 165 installed on the client device 109 can receive the command to install the container application 167. The management service 120 can alternatively place the command to install the container application 167 in a command queue for the client device 109. The client device 109 can check in with the management service 120 and retrieve the command from the command queue. The command to install the container application 167 can include a network address to download the container application 167. The network address can identify a network endpoint of the management system 103, the application hosting system 106, or another network endpoint to download the container application 167. The management application 165 can implement the command to download and install the container application 167 on the client device 109. The management service 120 can also utilize a push notification service to push a command for the client device 109 to check in with the management service 120. In other cases, the management service 120 can cause the push notification service to push the command to install the container application 167 to the client device 109 or the management application 165.

The management service 120 can generate the container application 167 and can provide a location or network address to download the container application 167. The container application 167 can include the management SDK 174. The management service 120 can also generate the management SDK 174 to include functions that can allow communication and authentication with the management service 120. The management SDK 174 can also specify particular network endpoints of the management service 120 for particular types of communications.

In step 406, the management service 120 can cause the client device 109 to load a web application 149. The management service 120 can generate a command to load the web application 149. The management application 165 or the container application 167 can receive the command to load the web application 149. The command to load the web application 149 can include a network address to access the web application 149. The network address can identify a network endpoint of the management system 103, the application hosting system 106, or another network endpoint to access the web application 149. The management service 120 can place the command to load the web application 149 in a command queue for the client device 109. The client device 109 can check in with the management service 120 and retrieve the command from the command queue. Alternatively, the command can be a command to launch or execute the web application 149 by accessing the web application 149, loading it into a container, and executing it.

The web application 149 can be loaded based on a push notification. The management service 120 can utilize a push notification service to push a command for the client device 109 to check in with the management service 120. The client device 109 can retrieve the command to load the web application 149. The management service 120 can alternatively cause the push notification service to push the command to load the web application 149 to the client device 109, the management application 165, or the container application 167. The push notification can include an identifier of the web application 149 or otherwise identify the web application 149. Also, a user can command the web application 149 to be loaded by selecting the web application 149 through an application store, or a network site of the application hosting service 146.

In step 409, the management service 120 can receive, from the client device 109, a request for policies 131 that are associated with the web application 149. The request can include an identifier of the web application 149. The request can also include user credentials or otherwise identify a user account. The request can be received at a network endpoint of the management service 120 that is specified in the management SDK 174 for policy requests.

In step 412, the management service 120 can transmit a policy or policies 131 to the client device 109. The management service 120 can map the identifier of the web application 149 to an application-specific policy 131 for the web application 149. The management service 120 can also modify the policy 131 to be user-specific. The management service 120 can identify the client device 109, and a particular user account can be identified based on the client device 109. In other cases, the request can include user credentials or otherwise identify a user account. The management service 120 can map the web application 149 and the user account to a particular policy 131. The management service 120 can also modify an application-specific policy 131 to be user specific based on the user account. For example, administrative users may have fewer restrictions than other users. The policies 131 can be modified so that administrative users have a certain set of hardware and software features enabled, regardless of the default application-specific policy 131 for the web application 149.

In step 415, the management service 120 can transmit a push notification for the web application 149. The management service 120 can identify a push notification service that is associated with the client device 109. A particular push notification service can be associated with a particular operating system, platform, or hardware of the client device 109. The management service 120 can transmit the push notification to the push notification service, which can forward or deliver the push notification to the client device 109. The push notification can identify the web application 149 or the container application 167.

Figure 5A:
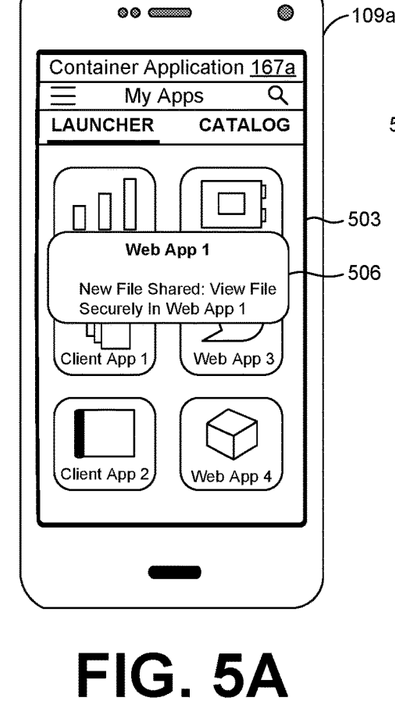
FIGS. 5A-C are drawings illustrating functionality implemented by components of the networked environment and rendered on the client device.

In FIG. 5A, shown is an example illustration of container application 167a rendered for display on a display device 503 of a client device 109a. The container application 167a can be designed to execute on an operating system or platform of the client device 109a. The container application 167a can generate a user interface that includes an application launcher interface. The application launcher can include a list of applications that can be launched from the container application 167a. The list of applications can include client applications 166 and web applications 149. As shown, the client applications 166 can include the client app 1 and the client app 2. The web applications 149 can include the web app 1, web app 2, web app 3 and web app 4. The user interface of the container application 167a can include a respective user interface element that when selected launches a corresponding application to be launched or executed.

A push notification 506 can also be shown on the display of the client device 109a. When the push notification 506 is selected, the container application 167a can launch the corresponding web application 149, and the web application 149 can implement an action associated with the push notification 506. For example, the push notification 506 indicates that a new file is shared to the web app 1. When selected, the container application 167a can cause the web app 1 to be launched, and the web app 1 can cause the file to be displayed on the client device 109.

Figure 5B:
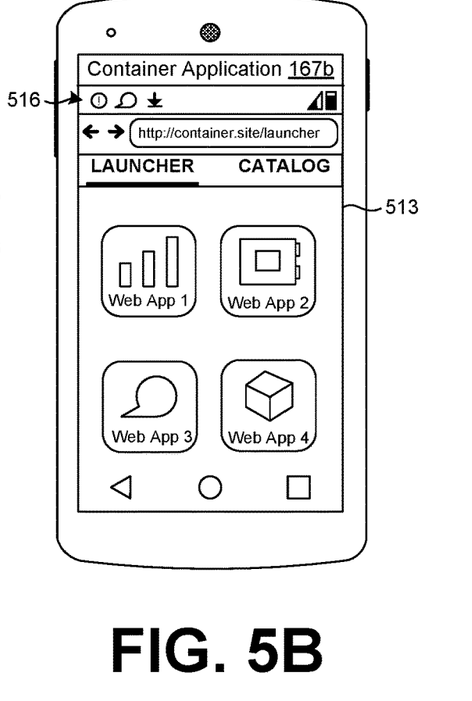

In FIG. 5B, shown is an example illustration of container application 167b rendered for display on a display device 513 of a client device 109b. The container application 167b can be designed to execute on an operating system or platform of the client device 109b, which can be a different operating system than is used for the client device 109a. Accordingly, different container applications 167 can be executed on different operating systems or platforms. Container application 167b can be a browser application. The browser application can include the management SDK 174 and apply it to each of the web applications 149. The container application 167b can access a launcher website at a particular network address. The container application 167b can access the launcher website to generate a user interface that includes an application launcher interface. The application launcher interface can include a list of web applications 149. Although the container applications 167a and 167b are executed on different platforms or operating systems, each can utilize the same web applications 149 that are accessed by the container application 167a.

Push notifications 516 can also be shown on the display of the client device 109b. When the push notification 516 is selected, the container application 167b can launch a corresponding web application 149, and the web application 149 can implement an action associated with the selected push notification 516.

Figure 5C:
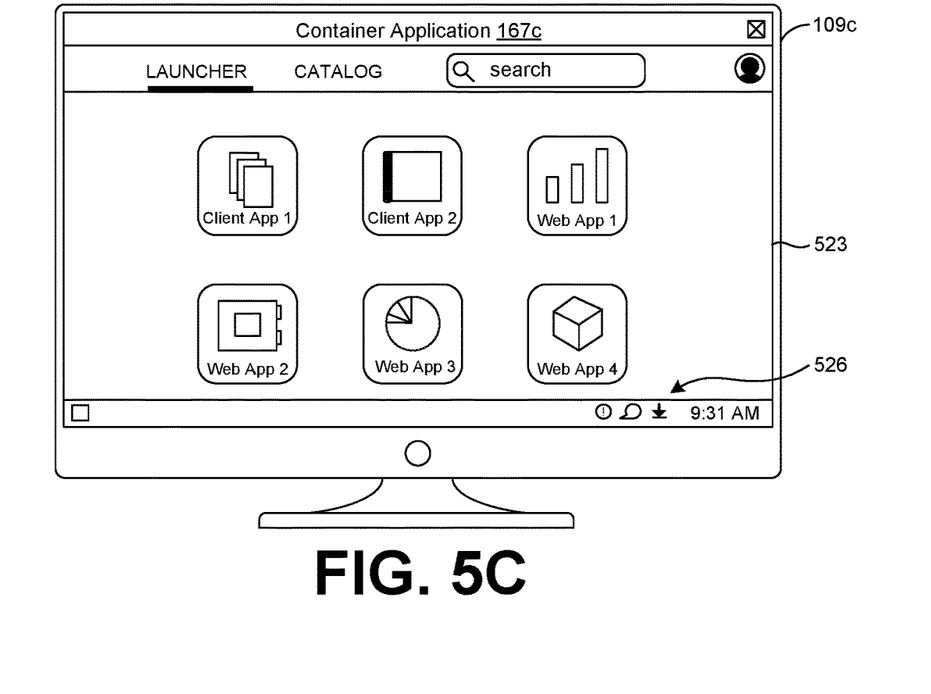

In FIG. 5C, shown is an example illustration of container application 167c rendered for display on a display device 523 of a client device 109c. The container application 167c can be designed to execute on an operating system or platform of the client device 109c, which can be different from the operating systems for each of the client devices 109a and 109b. The container application 167c can generate a user interface that includes an application launcher interface. The application launcher interface can include a list of applications that can be launched from the container application 167c. The list of applications can include client applications 166 and web applications 149. As shown, the client applications 166 can include the client app 1 and the client app 2. The web applications 149 can include the web app 1, web app 2, web app 3 and web app 4. The user interface of the container application 167a can include a respective user interface element that when selected launches or executes a corresponding application. The client applications 1 and 2 can be designed and coded specifically to operate on the operating system of the client device 109c. However, the web applications 149, including the web app 1, web app 2, web app 3 and web app 4 can have the same application logic or code that is utilized to load and execute them within the container applications 167a and 167b.

Push notifications 526 can also be shown on the display of the client device 109c. When the push notification 526 is selected, the container application 167c can cause a corresponding web application 149 to be launched, and the web application 149 can implement an action associated with the selected push notification 526.

The client devices 109, devices of the management system 103, and devices of the application hosting system 106 can include at least one processor circuit, for example, having a processor and at least one memory device, both of which couple to a local interface, respectively. The device can include, for example, at least one computer, mobile device, smartphone, computing device, or like device. The local interface can include, for example, a data bus with an accompanying address/control bus or other bus structure.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape or other memory components.

Memory can include both volatile and nonvolatile memory and data storage components. Also, a processor can represent multiple processors or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which a user interface generated by a client application 166, container application 167, web application 149 or another application can be rendered. The user interface can be generated with user interface data provided by the management system 103. The client devices 109 can also include one or more input/output devices that can include, for example, a capacitive touchscreen or other type of touch input device, fingerprint reader, or keyboard.

Although the management service 120, client applications 166, container application 167, web applications 149 and other various services and functions described can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system for web application security through containerization, the system comprising:
a client device; and
instructions executable in the client device, wherein the instructions, when executed, cause the client device to:
execute a container application, the container application comprising a management software development kit (SDK) associated with a management service;
provide, by the container application, management functionalities comprising a single sign-on functionality to a plurality of web applications by applying the management SDK of the container application to the web applications that are launched from the container application;
retrieve from the management service, at load time of a particular web application launched from the container application, using the management SDK of the container application, a security policy for the particular web application, wherein the container application loads the particular web application in a sandboxed environment defined in the security policy based at least in part on a push notification comprising an identifier of the particular web application;
utilize, by the container application, user credentials previously entered through the container application and stored on the client device using the management SDK, to provide the single sign-on functionality to the particular web application using a function defined by the management SDK of the container application without a user re-entering the user credentials;
receive, by the client device, the push notification comprising the identifier of the particular web application and an indication that a file is shared to the particular web application;
generate, by the container application, a user interface element that shows an identification of the particular web application, visually indicates that the file is shared, and describes a file sharing functionality of the particular web application; and
launch, by the container application, the particular web application based at least in part on a user selection of the user interface element, wherein the container application causes the particular web application to access the file and provide the file sharing functionality based on the indication that the file is shared as specified within the notification.

2. The system of claim 1, wherein the particular web application is loaded based on the notification comprising an identifier of the particular web application.

3. The system of claim 2, wherein the user credentials are associated with a user account with the management service.

4. The system of claim 1, wherein the security policy comprises a data loss prevention setting that is applied to the particular web application using another function defined by the management SDK of the container application, the data loss prevention setting comprising at least one of: a copy and paste into setting, a copy and paste out setting, a printing setting, a camera setting, an email setting, a Bluetooth setting, or a screenshot setting.

5. The system of claim 1, wherein the security policy enables usage of the particular web application based on a location of the client device relative to a geographical area.

6. The system of claim 1, wherein the user interface element comprises a pop-up notification shown on or over a user interface of the container application.

7. The system of claim 1, wherein the container application reduces storage redundancy by utilizing a single copy of the management SDK for the plurality of web applications that are accessed through the container application.

8. A method performed by instructions executed by a client device, the method comprising:
- executing a container application, the container application comprising a management software development kit (SDK) associated with a management service;
- providing, by the container application, management functionalities comprising a single sign-on functionality to a plurality of web applications by applying the management SDK of the container application to the web applications that are launched from the container application;
- retrieving from the management service, at load time of a particular web application launched from the container application, using the management SDK of the container application, a security policy for the particular web application, wherein the container application loads the particular web application in a sandboxed environment defined in the security policy based at least in part on a push notification comprising an identifier of the particular web application;
- utilizing, by the container application, user credentials previously entered through the container application and stored on the client device using the management SDK, to provide the single sign-on functionality to the particular web application using a function defined by the management SDK of the container application without a user re-entering the user credentials;
- receiving, by the client device, the push notification comprising the identifier of the particular web application and an indication that a file is shared to the particular web application;
- generating, by the container application, a user interface element that shows an identification of the particular web application, visually indicates that the file is shared, and describes a file sharing functionality of the particular web application; and
- launching, by the container application, the particular web application based at least in part on a user selection of the user interface element, wherein the container application causes the particular web application to access the file and provide the file sharing functionality based on the indication that the file is shared as specified within the notification.

9. The method of claim 8, wherein the particular web application is executed based on the notification comprising an identifier of the particular web application.

10. The method of claim 9, wherein the user credentials are associated with a user account with the management service.

11. The method of claim 8, wherein the security policy comprises a data loss prevention setting that is applied to the particular web application using another function defined by the management SDK of the container application, the data loss prevention setting comprising at least one of: a copy and paste into setting, a copy and paste out setting, a printing setting, a camera setting, an email setting, a Bluetooth setting, and a screenshot setting.

12. The method of claim 8, wherein the security policy enables usage of the particular web application based on a location of the client device relative to a geographical area.

13. The method of claim 8, wherein the user interface element comprises a pop-up notification shown on or over a user interface of the container application.

14. The method of claim 8, wherein applying the security policy to the sandboxed environment of the particular web application causes the management SDK of the container application to route requests for enterprise data through a proxy server address specified by the security policy.

15. A non-transitory computer-readable medium comprising instructions executable in a client device, wherein the instructions, when executed, cause the client device to:
- execute a container application, the container application comprising a management software development kit (SDK) associated with a management service;
- provide, by the container application, management functionalities comprising a single sign-on functionality to a plurality of web applications by applying the management SDK of the container application to the web applications that are launched from the container application;
- retrieve from the management service, at load time of a particular web application launched from the container application, using the management SDK of the container application, a security policy for the particular web application, wherein the container application loads the particular web application in a sandboxed environment defined in the security policy based at least in part on a push notification comprising an identifier of the particular web application;
- utilize, by the container application, user credentials previously entered through the container application and stored on the client device using the management SDK, to provide the single sign-on functionality to the particular web application using a function defined by the management SDK of the container application without a user re-entering the user credentials;
- receive, by the client device, the push notification comprising the identifier of the particular web application and an indication that a file is shared to the particular web application;
- generate, by the container application, a user interface element that shows an identification of the particular web application, visually indicates that the file is shared, and describes a file sharing functionality of the particular web application; and
- launch, by the container application, the particular web application based at least in part on a user selection of the user interface element, wherein the container application causes the particular web application to access the file and provide the file sharing functionality based on the indication that the file is shared as specified within the notification.

16. The non-transitory computer-readable medium of claim 15, wherein the particular web application is executed based on the notification comprising an identifier of the particular web application.

17. The non-transitory computer-readable medium of claim 16, wherein the user credentials are associated with a user account with the management service.

18. The non-transitory computer-readable medium of claim 15, wherein the security policy comprises a data loss prevention setting that is applied to the particular web application using another function defined by the management SDK of the container application, the data loss prevention setting comprising at least one of: a copy and paste into setting, a copy and paste out setting, a printing setting, a camera setting, an email setting, a Bluetooth setting, and a screenshot setting.

19. The non-transitory computer-readable medium of claim 15, wherein the security policy enables usage of the particular web application based on a location of the client device relative to a geographical area.

20. The non-transitory computer-readable medium of claim 15, wherein the user interface element comprises a pop-up notification shown on or over a user interface of the container application.

\* \* \* \* \*